United States Patent Office.

PHILIP KEENAN AND EDWARD O'CONNOR, OF BROWNSTOWN, PENNSYLVANIA.

*Letters Patent No.* 50,937, *dated November* 14, 1865; *antedated August* 26, 1865; *reissue No* 2,152, *dated January* 23, 1866; *reissue No.* 2,689, *dated July* 16, 1867.

IMPROVEMENT IN PUDDLING-FURNACES.

The Schedule referred to in these Letters Patent and making part of the same.

TO ALL WHOM IT MAY CONCERN:

Be it known that we, PHILIP KEENAN and EDWARD O'CONNOR, of Brownstown, formerly of West Manchester, in the county of Allegheny, and State of Pennsylvania, have invented a new and useful Improvement in "Fixing" for Puddling or Boiling-Furnaces; and we do hereby declare that the following is a full and exact description thereof.

The nature of our invention consists in the use of pulverized iron ore as a "fixing" for puddling or boiling furnaces, when said ore is mixed with fire-clay or other refractory material, and used for "fixing" those portions of the furnace which need protection, said "fixing" being made into a pasty or adhesive mass and used without previous melting of the "fix."

To enable others skilled in the art of puddling or boiling iron to make and use our invention, we will proceed to describe its construction and operation.

We take any good iron ore and pulverize it, and then mix a small quantity of fire-clay or other refractory material with the powdered iron ore, taking care to mix the ore and clay together in a thorough manner, after which we add to this mixed mass of ore and clay a sufficient quantity of water or other suitable liquid to make the whole into a pasty or adhesive mass, which is applied to those portions of the furnace which need protection, by means of the ordinary tools used in "fixing" puddling or boiling furnaces, said application of the "fix" being used and applied without previous melting of the "fix." After the furnace is prepared with this cold or unmelted "fix" it is charged with iron, which is melted and worked in the usual manner, which process is well understood by the skillful puddler or boiler.

The advantages of our improvement in "fix" are as follows: We save time in fixing the furnace; save the fuel required in melting the "fix," and avoid the use of scrap iron in "fixing," all of which greatly facilitate the process of puddling or boiling iron.

We wish it clearly understood that a cold "fix," made of lump iron ore, set around in the puddling furnace, has been used for "fixing." We are also aware that a cold "fix," consisting of what is termed "bog ore," has been used for "fixing" puddling furnaces. Therefore, we wish it clearly understood that we do not claim broadly a cold "fix" when said "fix" is formed by setting lump ore around the furnace, or when said "fix" is formed by the use of "bog ore." We desire to confine our invention to the use of iron ore, pulverized and treated substantially as hereinbefore described.

Having thus described the nature, construction, and operation of our improvement, what we claim as of our invention, is—

The use of pulverized ore and water, in combination with fire-clay, when used for "fix" in the preparation of furnaces used for puddling or boiling in the manufacture of iron, as herein described and set forth.

PHILIP KEENAN,
EDWARD O'CONNOR.

Witnesses:
JAMES J. JOHNSTON,
ALEXANDER HAYS.